(12) United States Patent
Rockstroh et al.

(10) Patent No.: US 7,784,183 B2
(45) Date of Patent: Aug. 31, 2010

(54) SYSTEM AND METHOD FOR ADJUSTING PERFORMANCE OF MANUFACTURING OPERATIONS OR STEPS

(75) Inventors: Todd Jay Rockstroh, Maineville, OH (US); James Joseph Hoffman, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1335 days.

(21) Appl. No.: 11/148,191

(22) Filed: Jun. 9, 2005

(65) Prior Publication Data

US 2006/0277754 A1 Dec. 14, 2006

(51) Int. Cl.
*B21D 53/78* (2006.01)
*B21K 25/00* (2006.01)
*B23P 19/00* (2006.01)
*B23P 23/00* (2006.01)

(52) U.S. Cl. .............. 29/889.71; 29/889.721; 29/889.2; 29/564; 29/711

(58) Field of Classification Search ............ 29/889.721, 29/889.71, 712, 711, 564
See application file for complete search history.

(56) References Cited

U.S. PATENT DOCUMENTS

| | | | |
|---|---|---|---|
| 3,555,254 A | 1/1971 | Gerber et al. | |
| 3,627,997 A | 12/1971 | Samuels et al. | |
| 4,215,406 A | 7/1980 | Gomola et al. | |
| 4,215,407 A | 7/1980 | Gomola et al. | |
| 4,227,245 A | 10/1980 | Edblad et al. | |
| 4,382,215 A | 5/1983 | Barlow et al. | |
| 4,389,706 A | 6/1983 | Gomola et al. | |
| 4,590,578 A | 5/1986 | Barto, Jr. et al. | |
| 4,636,960 A | 1/1987 | McMurtry | |
| 4,811,253 A | 3/1989 | Johns | |
| 4,816,729 A | 3/1989 | Carlson | |

(Continued)

FOREIGN PATENT DOCUMENTS

DE 10335657 A1 2/2005

*Primary Examiner*—Jermie E. Cozart
*Assistant Examiner*—Alexander P Taousakis
(74) *Attorney, Agent, or Firm*—V G Ramaswamy; William Scott Andes; General Electric Company

(57) ABSTRACT

A manufacturing system and manufacturing method for adjusting the performance of manufacturing operations or steps in manufacturing components having three-dimensional external structural characteristics. An embodiment of the system broadly comprises: (a) a plurality of manufacturing operations for processing a component having three-dimensional external structural characteristics; (b) at least one analytical device for analyzing at least one characteristic of the component after the performance of one or more manufacturing operations to generate a component data set; (c) at least one data storage device for storing the generated component data sets and for providing at least a relevant portion of accumulated component data; and (d) a communication mechanism for transmitting at least a relevant portion of accumulated component data to one or more manufacturing operations so that the performance thereof can be adjusted in response to the transmitted portion of accumulated component data. An embodiment of the method broadly comprises the following steps: (a) providing a component having three-dimensional external structural characteristics; (b) providing at least a relevant portion of accumulated component data comprising at least two different component data sets; and (c) performing a manufacturing step on the component to provide a processed component, wherein the at least relevant portion of accumulated component data is used to adjust the manner in which the manufacturing step is performed.

4 Claims, 3 Drawing Sheets

U.S. PATENT DOCUMENTS

| | | | |
|---|---|---|---|
| 4,866,643 A | 9/1989 | Dutler | |
| 4,908,951 A | 3/1990 | Gurny | |
| 4,974,165 A | 11/1990 | Locke et al. | |
| 5,055,752 A | 10/1991 | Leistensnider et al. | |
| 5,272,818 A | 12/1993 | Youdent et al. | |
| 5,288,209 A | 2/1994 | Therrien et al. | |
| 5,329,457 A | 7/1994 | Hemmerle et al. | |
| 5,351,196 A | 9/1994 | Sowar et al. | |
| 5,357,450 A | 10/1994 | Hemmerle et al. | |
| 5,384,950 A | 1/1995 | Kallenberger | |
| 5,465,780 A | 11/1995 | Munter et al. | |
| 5,609,779 A | 3/1997 | Crow et al. | |
| 5,796,619 A | 8/1998 | Wampler | |
| 5,983,982 A * | 11/1999 | Vihtelic et al. | 164/516 |
| 6,060,854 A | 5/2000 | Yutkowitz | |
| 6,106,204 A | 8/2000 | Dansereau et al. | |
| 6,256,546 B1 | 7/2001 | Graham et al. | |
| 6,332,926 B1 | 12/2001 | Pfaendtner et al. | |
| 6,339,208 B1 | 1/2002 | Rockstroh et al. | |
| 6,453,211 B1 | 9/2002 | Randolph et al. | |
| 6,567,717 B2 | 5/2003 | Krivokapic et al. | |
| 6,586,755 B1 | 7/2003 | Krivokapic et al. | |
| 6,616,969 B2 | 9/2003 | Pfaendtner et al. | |
| 6,640,151 B1 | 10/2003 | Somekh et al. | |
| 6,650,422 B2 | 11/2003 | Singh et al. | |
| 6,658,640 B2 | 12/2003 | Weed | |
| 6,678,668 B2 | 1/2004 | Fisher et al. | |
| 6,681,464 B1 | 1/2004 | Dupuis et al. | |
| 6,687,558 B2 | 2/2004 | Tuszynski | |
| 6,728,587 B2 | 4/2004 | Goldman et al. | |
| 6,732,009 B2 | 5/2004 | Shirakawa et al. | |
| 2003/0014144 A1 | 1/2003 | Krivokapic et al. | |
| 2003/0104650 A1 | 6/2003 | Yen et al. | |
| 2003/0149501 A1 | 8/2003 | Tuszynski | |
| 2003/0176938 A1 | 9/2003 | Tuszynski | |
| 2004/0225615 A1 * | 11/2004 | Abert | 705/64 |
| 2006/0229759 A1 | 10/2006 | Luketic et al. | |

\* cited by examiner

SYSTEM AND METHOD FOR ADJUSTING PERFORMANCE OF MANUFACTURING OPERATIONS OR STEPS

BACKGROUND OF THE INVENTION

This invention broadly relates to a manufacturing system and manufacturing method for adjusting the performance of manufacturing operations or steps in manufacturing components having three-dimensional external structural characteristics by using accumulated component data.

In a gas turbine (e.g., jet) engine, air is drawn into the front of the engine, compressed by a shaft-mounted compressor, and mixed with fuel. The mixture is burned, and the hot exhaust gases are passed through a turbine mounted on the same shaft. The flow of combustion gas turns the turbine by impingement against an airfoil portion of the turbine blades and vanes, which turns the shaft and provides power to the compressor.

Turbine blades used in compressors, turbines, vanes, blisks, etc., comprise an airfoil. These turbine airfoils typically have relatively complex configurations and shapes with three-dimensional external and internal structural characteristics that contribute to this complexity. For example, in addition to the typically curved or twisted external shape of turbine airfoils, many turbine airfoils have one or more internal cooling passages with openings or holes at the external surface(s) of the airfoil for the passage of cooling air out to remove heat from the interior of the airfoil and, in some cases, to provide a boundary layer of cooler air at the external surface of the airfoil. To attain maximum cooling efficiency, these internal cooling passages are frequently positioned as close to the external surface of the airfoil as is consistent with maintaining the required mechanical properties of the airfoil, e.g., as little as about 0.020 inches (508 microns) in some cases. For non-blisk structures, turbine blades, typically further comprise a root portion extending from the airfoil having a dovetail formed therein so that the turbine blade can be removably received by a corresponding slots positioned along the periphery of the hub, disk, shaft, etc., of the compressor, turbine, vane, etc.

Many turbine blades are typically required for the hub, disk, shaft, etc., of each compressor, turbine, vane, etc., present in the gas turbine engine. This can make the consistent and reproducible manufacture of a plurality, and especially a multiplicity, of such components having such complex three-dimensional external and internal structural characteristics extremely difficult to achieve. The current manufacture of a complex component such as a turbine blade typically involves starting with a cast metal form having some but not all external and internal structural characteristics, such as the general airfoil shape or configuration, the internal cooling passages within the airfoil, etc. This cast form is then processed in several different manufacturing operations or steps (e.g., cutting, drilling, milling, welding, coating, etc.) that are carried out in sequence, for example, to form the dovetail, to form the openings or holes in the surface of the blade to connect to the internal cooling passages, to apply a protective coating to the external and/or internal surfaces of the blade, etc. The result of such manufacturing operations/steps is a finished or final turbine blade that hopefully resembles and is sufficiently close to a previously established set of specifications or requirements for the blade.

Current manufacturing systems for obtaining finished or final components such as turbine blades typically have various levels of numerical control. For example, the tool paths used for a given manufacturing operation or step can be electronically generated from master models previously established and determined for that component. This hopefully insures that each manufacturing operation or manufacturing step (e.g., grinding the cast form to form a dovetail, drilling openings or holes through the external surface of the airfoil to connect to the internal cooling passages, applying a protective coating to the external and/or internal surfaces of the airfoil, etc.), achieves the desired result, provided that the original cast form meets or is close to previously established specifications or requirements at the start, and also provided that each manufacturing operation or step is carried out according to the previously established specifications or requirements as the cast form is processed through the manufacturing system. In other words, the assumption is that the processed turbine blade, before and after each manufacturing operation or step in the manufacturing system, meets or satisfies some target condition, or more typically a set of target conditions from the product specifications or requirements. Unfortunately, in practice, the "perfect" or "ideal" typically does not occur in standard manufacturing systems/methods, especially with mass produced components such as turbine blades.

Instead, before and after each manufacturing operation or step of the manufacturing system/method, it is likely that there will be at least some deviation or variation in the processed blade from the previously determined and desired product specifications or requirements. These deviations and variations occur because of the complex external and/or internal structural characteristics of the turbine blade, and in particular the airfoil. These deviations and variations can also be present in the initial cast form of the turbine blade that is supplied to the manufacturing system/method. These deviations and variations tend to be carried forward to each subsequent manufacturing operation or step, and thus accumulate in the processed blade as it advances through the manufacturing system/method. While any deviation or variation in the processed blade can adversely affect the performance of each subsequent operation or step, it is usually the collection or accumulation of such deviations and variations as the processed blade moves through the manufacturing system/method that causes the resulting processed turbine blade to stray significantly from the previously determined product specifications or requirements for final turbine blade. Indeed, the resulting processed turbine blade can stray so much from these product specifications or requirements as to be unusable and therefore scrapped or discarded.

At the various operations or steps of a manufacturing system/method, a processed component such as a turbine blade is typically inspected, measured, examined, probed or otherwise analyzed to determine whether the processed component meets the previously established specifications or requirements for that particular operation or step. These inspections or other analyses can range from visual (human) inspections, including the use of manual devices such as micrometers, caliper gauging, etc., to more sophisticated analytical equipment and/or methods such as x-ray, airflow, pressurization, ultrasonic, eddy current inspections, etc. Such analyses can also be electronically controlled and can lead to the generation of precise data on the processed component at a given manufacturing operation or step of the manufacturing system/method. Unfortunately, this data is currently used only to assess overall trends in the manufacturing system associated with the given inspection or other analysis, and to make changes to the manufacturing system/method to correct long term trends outside the acceptable, defined limits.

Accordingly, it would be desirable to provide a manufacturing system and method for manufacturing components having three-dimensional external structural characteristics, as well as three-dimensional internal structural characteristics, for example, turbine components comprising airfoils having internal cooling passages, that has the ability to: (1) adjust the performance of one or more manufacturing operations/steps as the component is processed through the manufacturing system/method, even if there are deviations or variations in the characteristics of the starting component form and/or in how each manufacturing operation/step is carried out; (2) obtain a resulting finished or final component that achieves or more closely achieves previously determined product specifications or requirements; and/or (3) use the collected and accumulated analytical data (or relevant portion thereof) as an aid in carrying the various manufacturing operations or steps.

BRIEF DESCRIPTION OF THE INVENTION

An embodiment of this invention is broadly directed at a manufacturing method comprising the following steps:
   (a) providing a component having three-dimensional external structural characteristics;
   (b) providing at least a relevant portion of accumulated component data comprising at least two different component data sets; and
   (c) performing a manufacturing step on the component to provide a processed component, wherein the at least relevant portion of accumulated component data is used to adjust the manner in which the manufacturing step is performed.

Another embodiment of this invention is broadly directed at a manufacturing system comprising:
   (a) a plurality of manufacturing operations for processing a component having three-dimensional external structural characteristics;
   (b) at least one analytical device for analyzing at least one characteristic of the component after the performance of one or more manufacturing operations to generate a component data set;
   (c) at least one data storage device for storing the generated component data sets and for providing at least a relevant portion of accumulated component data; and
   (d) at least one communication mechanism for transmitting the at least relevant portion of accumulated component data to one or more manufacturing operations so that the performance thereof can be adjusted in response to the transmitted portion of accumulated component data.

Another embodiment of this invention is broadly directed at a manufacturing method comprising the following steps:
   (a) providing a component form for obtaining a processed component having three-dimensional external structural characteristics;
   (b) providing at least a relevant portion of a component form data set;
   (c) performing a first manufacturing step on the component form to provide a processed component, wherein the at least relevant portion of the component form data set is used to adjust the manner in which the first manufacturing step is performed;
   (d) analyzing the processed component to provide a processed component data set;
   (e) combining the component form data set with the processed component data set to provide accumulated component data;
   (f) performing a second manufacturing step on the processed component, wherein at least a relevant portion of the accumulated component data is used to adjust the manner in which the second manufacturing step is performed; and
   (g) repeating steps (d) through (f) one or more times until a final manufactured component is obtained.

The embodiments of the system and method of this invention provide a number of advantages and benefits in manufacturing components having three-dimensional external structural characteristics, and typically further having internal, three-dimensional, such as turbine components comprising airfoils having internal cooling passages. For example, embodiments of the system and method of this invention provide the ability to adjust the performance of one or more manufacturing operations/steps as the component is processed through the manufacturing system/method, even if there are deviations or variations in the characteristics of the starting component form and/or in how each manufacturing operation/step is carried out. In addition, embodiments of the system and method of this invention provide the ability to obtain resulting finished or final components that achieve or more closely achieve previously determined product specifications or requirements. In particular, embodiments of the system and method of this invention use the collected and accumulated analytical data (or relevant portion thereof) in adjusting the performance of one or more manufacturing operations or steps that are carried out in processing the component.

DETAILED DESCRIPTION OF THE INVENTION

Figure 1:
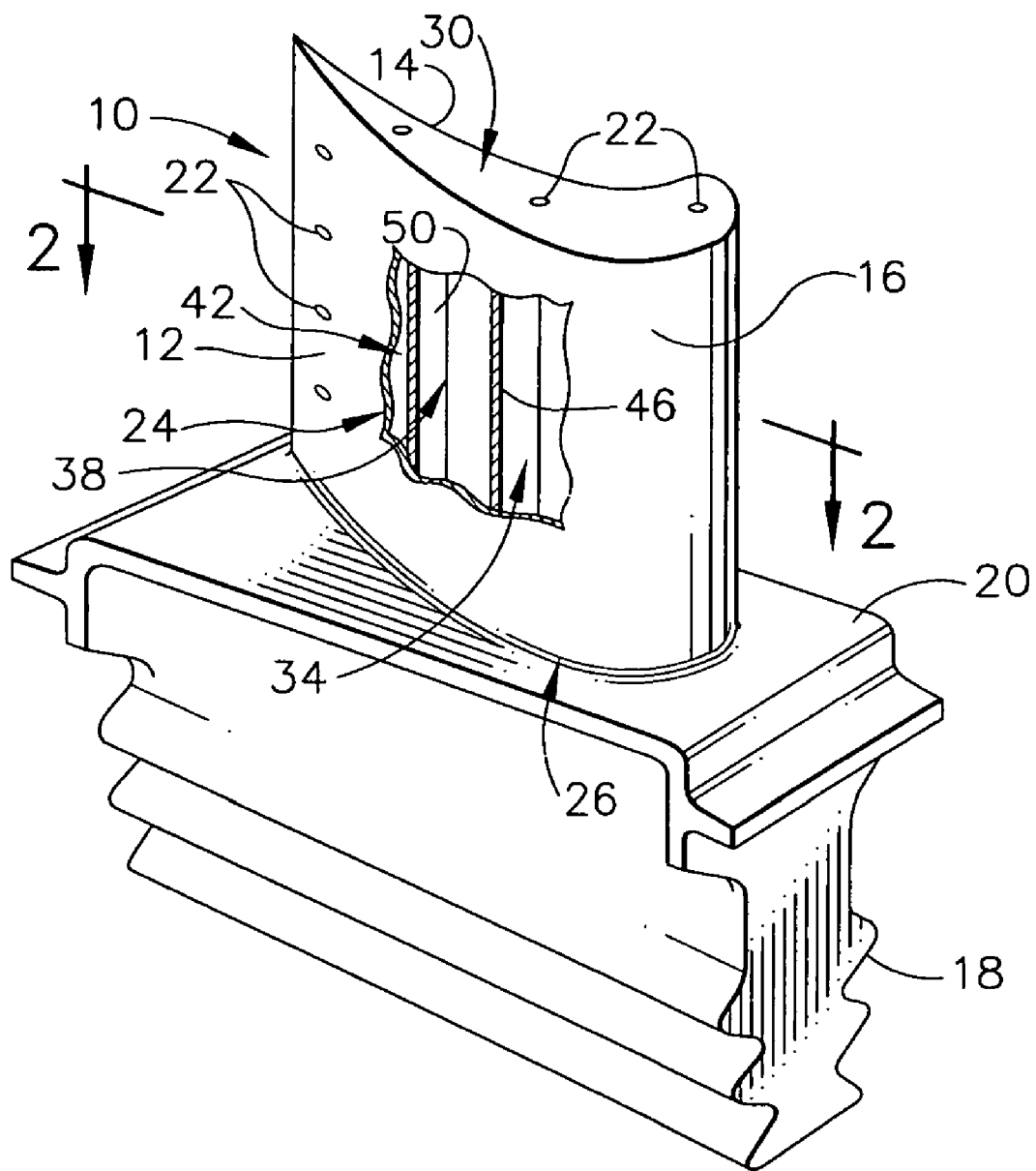
FIG. 1 is perspective view of a turbine blade with portions broken away to show the internal structure of the turbine blade.

As used herein, the term "component" refers generally to an item, article, element, part, workpiece, etc., that is processed in an embodiment of the system or method of this invention to provide a final manufactured component.

As used herein, the term "component having three-dimensional external structural characteristics" refers to any component having three-dimensional external structural characteristics (e.g., a three-dimensional external shape, configuration, etc., such as convex external surfaces, concave external surfaces, etc.). Components having three-dimensional external structural characteristics can further include three-dimensional internal structural characteristics (e.g., a three-dimensional internal structure, such as one or more internal cooling passages, etc.). Components with three-dimensional external and internal structural characteristics are often complex in terms of shape, configuration, positioning, orientation, etc., of these external and internal structural characteristics. Components having three-dimensional external structural characteristics, as well as three-dimensional internal structural characteristics, include but are not limited to buildings and the various constituents parts thereof (e.g., girders, gutters, trusses, etc.), equipment, machine tools, various other mechanical and/or electrical motors or parts thereof (e.g., valves, etc.), vehicles of various types, for examples, automobiles and the various constituent parts thereof such as automobile engines, automobile frames, etc., ships and the various constituent parts thereof such as the hull, superstructure, etc., airplanes and the various constituent parts thereof such as the wings, fuselage, engines, etc. Components that the embodiments of the system and method of this invention are particularly useful in manufacturing are gas turbine engine components (hereafter referred to as "turbine components"). Representative examples of turbine components having three-dimensional external and internal structural characteristics include but are not limited to turbine components comprising airfoils (e.g., turbine blades, turbine vanes, turbine blisks, etc.), turbine shrouds, turbine nozzles, combustors, augmentor hardware of gas turbine engines, exhaust nozzles, etc.

As used herein, the term "processed component" refers to a component that has been subjected to one or more manufacturing operations or manufacturing steps.

As used herein, the term "component form" refers to a component prior to the point or stage that it is subjected to one or more manufacturing operations or manufacturing steps, including but not limited to a cast or forged form, a cast or forged blank, etc.

As used herein, the term "characteristic" refers to a quality, shape, configuration, design, size, length, width, thickness, height, composition, property, structure, feature, attribute, arrangement, order, orientation, etc., of the component that can be determined by inspection, examination, measurement, probe or other form of analysis of the component.

As used herein, the term "structural characteristic" refers to those characteristics relating to the two-dimensional, and more typically three-dimensional, shape, configuration, etc., of the component, or a portion of the component.

As used herein, the term "external structural characteristic" refers to the outward or exterior structural characteristics of the component (or portion thereof) that are typically visible to the human eye, such as the curved or twisted shape or configuration of the airfoil of a turbine blade (e.g., the convex and concave external surfaces, etc.), the shape or configuration of the dovetail of a turbine blade, etc.

As used herein, the term "internal structural characteristic" refers to inner or interior structural characteristics of the component (or portion thereof) that are typically, but not necessarily, partially or completely invisible to the human eye, such as the shape or configuration of the internal cooling passages of the airfoil of a turbine blade, the orientation or positioning of these internal cooling passages and/or the internal walls that defines these passages, etc.

As used herein, the term "data" refers to any information generated, obtained, collected, provided, supplied, etc., on one or more characteristics of the component as the result of inspecting, measuring, examining, probing or otherwise analyzing the component.

As used herein, the term "data set" refers to the total data generated, obtained, collected, provided, supplied, etc., on one or more characteristics of the component at or around the same time and/or after performance of a particular manufacturing operation or manufacturing step.

As used herein, the term "different data sets" refers to data sets that are generated, obtained, collected, provided, supplied, etc., on one or more characteristics of the component at different points in time and/or from inspection, measurement, examination, probe or other analysis of the component after different manufacturing operations or manufacturing steps.

As used herein, the term "accumulated component data" refers to the combined component data from two or more data sets, or portions such data sets.

As used herein, the term "manufacturing operation" refers to an action, function, etc., carried out by a machine, tool, equipment, apparatus, instrument, appliance, engine, device, mechanism, etc., in an embodiment of a manufacturing system of this invention. Manufacturing operations that can be carried out by a machine, tool, equipment, apparatus, instrument, appliance, engine, device, mechanism, etc., include, but are not limited to one or more of machining (e.g., mechanical machining, electrochemical machining (ECM), electrical/electrode discharge machining (EDM), etc.), drilling (e.g., mechanical drilling, laser drilling, etc.), boring, milling (e.g., mechanical milling, chemical milling, etc.), grinding, reaming, cutting, finishing, fabricating, assembling, shaping, forging, casting, welding, coating (e.g., applying a protective coating, etc.), testing, evaluating, etc. Manufacturing operations can be carried out chemically, mechanically, electrically, or any combination thereof.

As used herein, the term "manufacturing step" refers to any procedure, process, practice, etc., carried out in an embodiment of a manufacturing method of this invention. Manufacturing steps include, but are not limited to one or more of machining (e.g., mechanical machining, electrochemical machining (ECM), electrical/electrode discharge machining (EDM), etc.), drilling (e.g., mechanical drilling, laser drilling, etc.), boring, milling (e.g., mechanical milling, chemical milling, etc.), grinding, reaming, cutting, finishing, fabricating, assembling, shaping, forging, casting, welding, coating (e.g., applying a protective coating), testing, evaluating, etc. Manufacturing steps can be carried out chemically, mechanically, electrically, or any combination thereof.

As used herein, the term "manufacturing system" refers to an embodiment of the system of this invention comprising one or more manufacturing operations.

As used herein, the term "manufacturing method" refers to an embodiment of the method of this invention comprising one or more manufacturing steps.

As used herein, the term "manufacturing station" refers to a given point, place, position, etc., in the manufacturing system where one or more manufacturing operations are carried out.

As used herein, the term "adjust" refers to changing, altering, regulating, modifying, correcting, compensating, etc., the manner in which a given or particular manufacturing operation or manufacturing step is performed.

As used herein, the terms "transmission," "transmitting", "transmit" and the like refer to any type, manner, etc. of providing, supplying, inputting or otherwise transmitting data or data sets. Transmission of data/data sets herein is typically carried out electronically, including the use of wired electronic methods, wireless electronic methods or combinations thereof. Electronic transmissions can be carried out by a variety of local or remote electronic transmission methods, such as by using Local or Wide Area Network (LAN or WAN)-based, Internet-based, or web-based transmission methods, cable television or wireless telecommunications networks, or any other suitable local or remote transmission method.

As used herein, the term "computer" can refer to a personal computer (portable or desktop), server, mainframe computer, etc.

As used herein, the term "comprising" means various operations, steps, data, data sets, stations, etc., can be conjointly employed in this invention. Accordingly, the term "comprising" encompasses the more restrictive terms "consisting essentially of" and "consisting of."

The embodiments of the manufacturing system and manufacturing method of this invention are based on the discovery that the data (or at least the relevant portion thereof) obtained from inspecting, measuring, examining, probing or otherwise analyzing the component form and/or processed component at one or more, and typically at each manufacturing operation/step should be forwarded collectively and sequentially to one or more, and typically to each, subsequent manufacturing operation/step throughout the manufacturing system/method. For example, if the analytical data generated on the processed component after a given manufacturing operation/step "N" is inputted, forwarded or otherwise transmitted to the next manufacturing operation/step ("N+1"), the performance of manufacturing operation/step "N+1" may be changed, altered, regulated, modified, corrected, or otherwise adjusted with regard to various parameters (e.g., speed, feed rate, depth, tool path, tool orientation, etc.) in order to adjust and compensate for deviations or variations caused by manufacturing operation/step "N." (This analytical data for manufacturing operation/step "N" can also include that obtained on the component form at the start of the manufacturing system/method, for example, on the initial cast blade form.) Similarly, the collected or accumulated component data (or at least the relevant portion thereof) from manufacturing operations/steps "N" and "N+1" can then be inputted, forwarded or otherwise transmitted to the next manufacturing operation/step (i.e., "N+2") to adjust the performance of manufacturing operation/step "N+2", due to variations or deviations that have occurred in manufacturing operations/steps "N" and "N+1." This inputting/forwarding/transmitting of accumulated component data (or at least the relevant portion thereof) can be repeated or continued (e.g., for manufacturing operations/steps "N+3," "N+4," etc.) in order to compensate or otherwise adjust for deviations or variations caused by earlier manufacturing operation/steps "N," "N+1," "N+2," etc., until the final manufactured component is obtained.

Unfortunately, while this analytical data on the component form/processed component has previously been transmitted to or otherwise archived in a computer processing facility (e.g., a central mainframe computer or server system), this accumulated component data has not previously been used in one or more, and especially in each, subsequent manufacturing operation or manufacturing step to compensate or otherwise adjust for deviations or variations that occur in prior manufacturing operations/steps. In particular, this accumulated component data that is generated and collected from each analysis of the component form/processed component at the beginning of the manufacturing system or method, as well as after one or more, and especially each manufacturing operation or step, has previously not been forwarded, inputted or otherwise transmitted (i.e., "fed forward") to one or more, and especially in each, subsequent manufacturing operation or step so that appropriate alterations, changes, etc., can be made in subsequent manufacturing operations or steps to compensate or otherwise adjust for the deviations or variations that occur before or after each prior manufacturing operation/step. Instead, this accumulated component data has generally been used only to assess the overall trends in the manufacturing operations/steps associated with the analysis made, and to make changes to the manufacturing system/method to correct long term trends outside acceptable, defined limits. As a result, there is an increasing likelihood that final manufactured components obtained will be rejected and discarded because of lack of consistency and reproducibility against previously established specifications or requirements for the component because of deviations and variations that occur and accumulate in the manufacturing system/method. This is especially true in the manufacture of components having three-dimensional (e.g., complex) external and internal structural characteristics such as turbine blades comprising airfoils that have one or more internal cooling passages.

The embodiments of the manufacturing system and method of this invention solves these problems by utilizing the accumulated component data (or at least the relevant portion thereof) that is generated and collected from the analysis of the component after one or more, and typically after each prior manufacturing operation/step to adjust how one or more, and typically each subsequent manufacturing operation/step is performed or carried out. This accumulated component data can be "fed forward" in "real-time" (e.g., transmitted by a computerized electronic network) so that one or more and typically each of these subsequent manufacturing operations/steps can adequately compensate or otherwise adjust for deviations and variations that have previously occurred, including those due to variations or deviations in the component form that is supplied at the start of the manufacturing system/method. For example, these changes, alterations, etc., can involve the modification of specific parameters (e.g., speed, feed rate, tool path or orientation, etc.) in the manner of performing a given manufacturing operation/step. In addition, this accumulated component data (or relevant portion thereof) can be fed forward, inputted, or otherwise transmitted sequentially to each subsequent machining operation/step to consistently and continuously compensate or otherwise adjust for such deviations and variations in the processed component throughout the manufacturing system/method. This can enable the production of a plurality and especially a multiplicity of final manufactured components, such as turbine blades comprising airfoils having internal cooling passages that are consistently reproduced so that deviations and variations from previously established specifications and requirements in terms of form, function, shape, configuration, etc., are sufficiently minimized so as to be unnoticeable or undetectable. By having these final manufactured components consistently reproduced, these components can be used in manufacturing assemblies (e.g., compressors, vanes, etc., of gas turbine engines) requiring a plurality or multiplicity of such components without concerns of component-to-component variation that can lead to significant scrapping or discarding of components that deviate or vary too far from previously established product specifications or requirements.

These reduced variations in component-to-component manufacture provide many benefits and advantages, including but not limited to: (1) reduced assembly cost, e.g., eliminating the need to compensate for component variation and fit; (2) reduced testing costs, e.g., knowing that the manufacturing system/method will perform within a tighter tolerance range; (3) enhanced performance of the manufacturing system/method from having an improved "worst case" performance envelope; (4) extended performance range(s) based on "worst case" component assembly running in a more efficient manner; and (5) enhanced component offerings based on the capability to design new components based on controlled and electronically documented manufacturing deviations and variations.

An embodiment of the manufacturing method of this invention broadly comprises the following steps of: (a) providing a component having three-dimensional external structural characteristics; (b) providing at least a relevant portion of accumulated component data comprising at least two different component data sets; (c) and performing a manufacturing step on the component to provide a processed component, wherein the at least relevant portion of accumulated component data is used to adjust the manner in which the manufacturing step is performed. Step (a) typically involves providing a component having, in addition to three-dimensional external structural characteristics, three-dimensional internal structural characteristics, e.g., a turbine blade or vane comprising an airfoil having one or more internal cooling passages. Step (b) typically involves providing a relevant portion of accumulated component data that comprises a component data set obtained prior to the performance of any of the manufacturing steps, and one or more component data sets obtained after the performance of at least one manufacturing step. Steps (a) through (c) are typically carried out more than one time, i.e., steps (a) through (c) are repeated one or more times after step (c), and more typically steps (a) through (c) are repeated each time after step (c) until the final manufactured component is obtained.

An embodiment of the manufacturing system of this invention broadly comprises: (a) a plurality of manufacturing operations (e.g., grinding, drilling, etc.) for processing a component having three-dimensional external structural characteristics (and typically further including three-dimensional internal structural characteristics; (b) at least one analytical device (e.g., a probe, etc.) for analyzing at least one characteristic of the component after the performance of one or more manufacturing operations to generate a component data set; (c) at least one data storage device for storing the generated component data sets and for providing at least a relevant portion of accumulated component data; and (d) a communication mechanism for transmitting the at least relevant portion of accumulated component data to one or more manufacturing operations so that the performance thereof can be adjusted in response to the transmitted portion of accumulated component data. The plurality of manufacturing operations can be carried out sequentially at the same manufacturing station, at a plurality of manufacturing stations, or any combination thereof. The at least one analytical device typically analyzes the component after each manufacturing operation, and typically analyzes a plurality of characteristics of the component. The at least one data storage device typically comprises a central computer processing facility (e.g., central mainframe computer or server). The communication mechanism for transmitting the relevant portion of accumulated component data typically comprises a computerized electronic network connected to each of the central computer processing facility, the at least one analytical device and the one or more manufacturing operations (and typically to each manufacturing operation).

Another embodiment of the manufacturing method of this invention broadly comprises the following steps: (a) providing a component form for obtaining a processed component having three-dimensional external structural characteristics (and typically further including three-dimensional internal structural characteristics); (b) providing at least a relevant portion of a component form data set; (c) performing a first manufacturing step on the component form to provide a processed component, wherein the at least relevant portion of the component form data set is used to adjust the manner in which the first manufacturing step is performed; (d) analyzing the processed component to provide a processed component data set; (e) combining the component form data set with the processed component data set to provide accumulated component data; (f) performing a second manufacturing step on the processed component, wherein at least a relevant portion of the accumulated component data is used to adjust the manner in which the second manufacturing step is performed; and (g) repeating steps (d) through (f) one or more times after step (f) until a final manufactured component is obtained (and typically repeating steps (d) through (f) each time after step (f)). A specific embodiment of this manufacturing method (and corresponding manufacturing system for carrying out this method) is further illustrated by the following detailed description for obtaining a final-manufactured turbine component. It should also be understood that this specific embodiment of the manufacturing method and system of this invention can, by appropriate modification, be used to manufacture other components having three-dimensional external structural characteristics (as well as further including three-dimensional internal structural characteristics), can include other manufacturing operations/steps, can have the manufacturing operations/steps carried out in any desired sequence or order, etc.

This specific embodiment of a manufacturing method (and corresponding system) for obtaining a final manufactured turbine component is further illustrated by reference to the drawings as described hereafter. Referring to the drawings, FIG. 1 shows a final manufactured gas turbine engine component comprising an airfoil in the form of a turbine blade identified generally as 10. (Turbine vanes have a similar appearance to turbine blades 10 with respect to the pertinent portions.) Blade 10 comprises an airfoil 12 against which hot combustion gases are directed during operation of the gas turbine engine, and whose surfaces are therefore subjected to high temperature environments. Airfoil 12 has a "high-pressure side" indicated as 14 that is concavely shaped; and a suction side indicated as 16 that is convexly shaped and is sometimes known as the "low-pressure side" or "back side." In the operation of a gas turbine engine, the hot combustion gas is directed against the high-pressure side 14. Blade 10 is anchored to a turbine disk (not shown) with a dovetail 18 that extends from platform 20 of blade 10 and is received by slots along the periphery of the disk.

Figure 2:
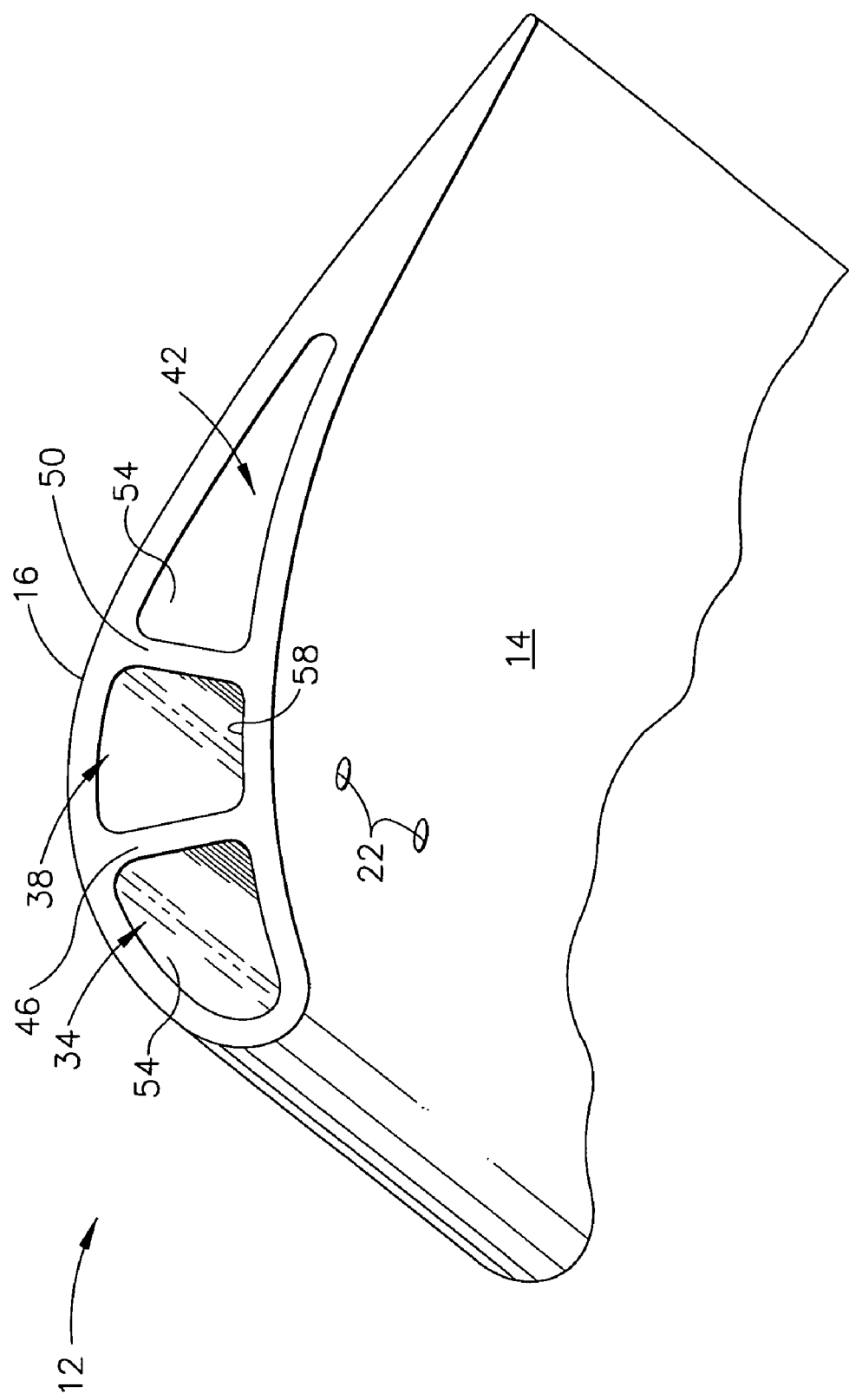
FIG. 2 is an enlarged sectional view of the turbine blade of FIG. 1 taken along line 2-2.

As shown in FIG. 1, there are a plurality of openings or holes indicated as 22 that are formed in convexly shaped low-pressure suction-side 16; a similar plurality of openings or holes 22 are also typically formed in concavely-shaped high-pressure side 14. These openings or holes 22 are formed in sides 16 and 14 to connect with one or more internal cooling passages extending through the interior indicated generally as 24 of the airfoil 12, from the root end indicated as 26 adjacent to dovetail 18, to the opposite distal tip end indicated as 30 remote from dovetail 18 that can also having openings or holes 22 that connect to the interior 24 of airfoil 12. While interior 24 of airfoil 12 can be provided with one such internal cooling passage (i.e., interior 24 of airfoil 12 is essentially hollow), FIG. 1 and especially FIG. 2 show interior 24 of airfoil 12 as having a plurality of such passages indicated as leading edge passage 34, central passage 38 and trailing edge passage 42 that are separated, respectively, by forward internal wall 46 and rearward internal wall 50, and that have internal surfaces indicated, respectively, as 54, 58 and 62. Airfoil 12 is also typically provided with a protective coating (not shown) such as an aluminide diffusion coating that is applied to the external surfaces of sides 14 and 16, as well as to internal surfaces 54, 58 and 62.

Typically, blade 10 is provided as a cast airfoil form (also referred to as a cast blade form or as a turbine blade blank) having internal cooling passages (e.g., passages 34, 38 and 42) formed in interior 24 of airfoil 12, but without the plurality of opening or holes 22 formed in sides 14 and 16, and with a blank root portion extending from platform 20, but without dovetail shape 18 formed therein. The cast airfoil form of blade 10 is also typically provided without the protective coating on the external surfaces of sides 14 or 16, as well as internal surfaces 54, 58 and 62.

Figure 3:
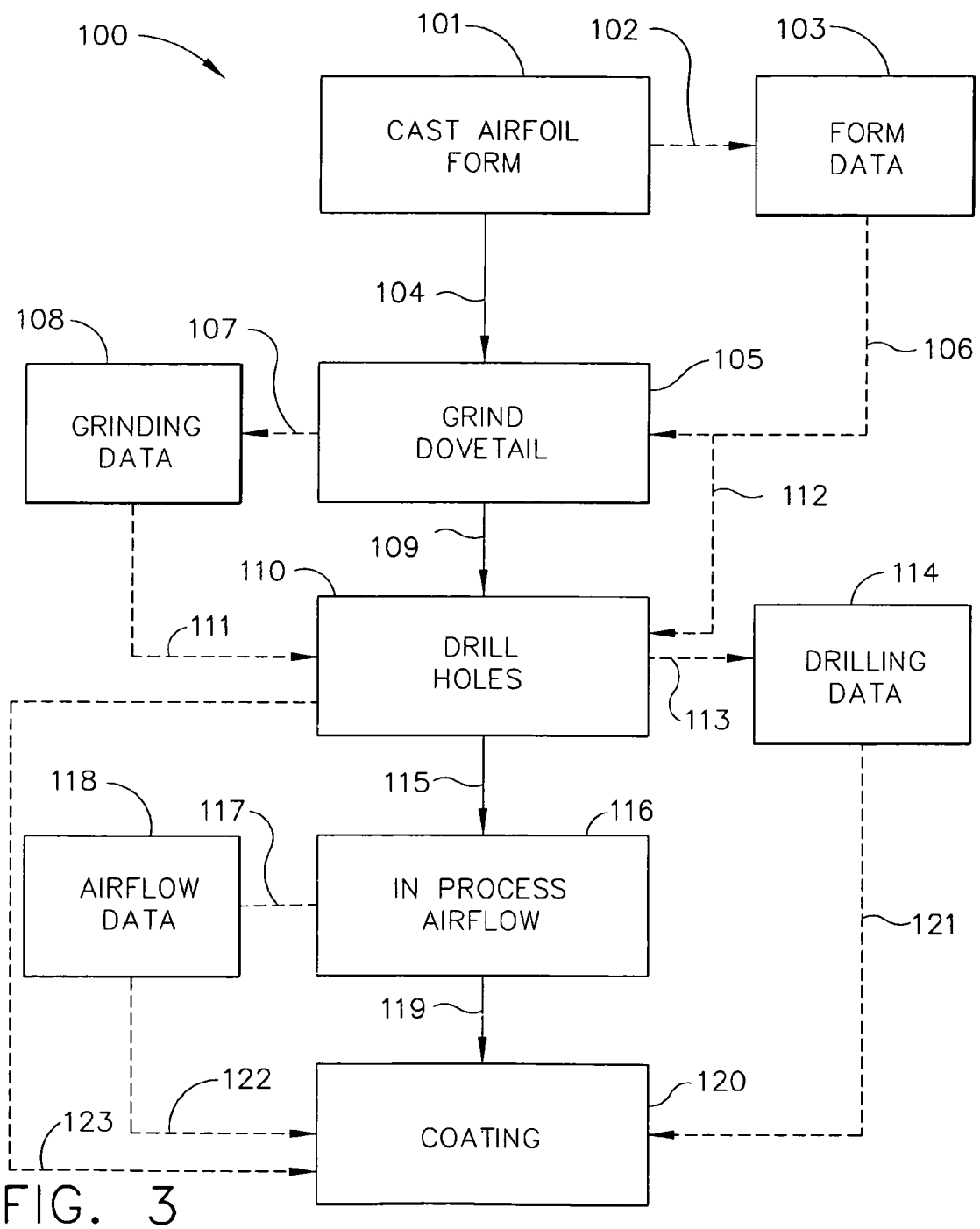
FIG. 3 represents a flow diagram of an embodiment of the system/method of this invention for manufacturing a turbine blade of the type shown in FIG. 1.

A specific embodiment of a method and system for providing this cast airfoil form with openings or holes 22, dovetail 18, and a protective coating on the external surfaces of sides 14 or 16, as well as internal surfaces 54, 58 and 62, to obtain a final manufactured blade 10 is illustrated by the flowchart shown in FIG. 3 where the method/system is indicated generally as 100. As shown in FIG. 3, the solid arrows (104, 109, 115, 119) represent the various sequential manufacturing operations/steps of the manufacturing system/method 100, while the dotted arrows (102, 106, 107, 111, 112, 113, 117, 121, 122, 123) represent the generation, collection, supplying, inputting, transmitting, etc., of data obtained by inspecting, measuring, examining, probing or otherwise analyzing the component (e.g., blade 10) before and/or after the various manufacturing operations/steps. Each of the manufacturing operations/steps of system/method 100 can be carried out sequentially at the same manufacturing station (e.g., the cast form does not move from manufacturing station to manufacturing station but is sequentially subjected to more than one manufacturing operation/step at the same manufacturing station), can be carried out sequentially at different manufacturing stations (e.g., the cast form is moved sequentially from manufacturing station to manufacturing station as it is processed), or a combination thereof (e.g., more than one manufacturing operation/step is carried out at one or more of the manufacturing stations, while a single manufacturing operation/step is carried out at one or more of the other manufacturing stations).

As shown in FIG. 3, the initial step in the method/system indicated as 101 provides the cast airfoil form (hereafter referred to as "cast form"). As shown by dotted arrow 102, the cast form is inspected, measured, examined, probed or otherwise analyzed either prior to and/or after being supplied to system/method 100 to determine its characteristics (e.g., external shape, configuration, orientation, size, thickness, etc., of sides 14 and 16, the location, shape, configuration, etc. of internal passages 34, 38 and 42, including the location, thickness, orientation, etc., of internal walls 46 and 50, the composition of the metal or metal alloy used in forming the cast form, etc.) to generate, obtain or otherwise provide form data indicated generally as 103. As shown in FIG. 3, the cast form from step 101 is sequentially moved, transferred, advanced or otherwise subjected in system/method 100, as indicated by solid arrow 104, to a first manufacturing operation/step indicated generally as 105 to form dovetail shape 18 in the cast form (hereafter referred to as "ground component"), Operation/step 105 can be carried out, for example, by grinding the blank root portion of the cast form extending from airfoil 12. Prior to or during grinding operation/step 105, form data 103 is provided, supplied, inputted or otherwise transmitted, as indicated by dotted arrow 106, to grinding operation/step 105 so that the performance thereof can be appropriately adjusted, as necessary, to form dovetail 18 within previously determined specifications or requirements.

After forming dovetail 18 in grinding operation/step 105, the ground component is inspected, measured, examined, probed or otherwise analyzed as indicated by dotted arrow 107 to determine the characteristics (e.g., shape and configuration of dovetail, etc.) of the ground form to generate, obtain, or otherwise provide data (hereafter referred to as "grinding data") indicated as 108. The ground component is then sequentially moved, transferred, advanced or otherwise subjected, as indicated by solid arrow 109, to a second manufacturing operation/step indicated generally as 110. In this embodiment of system/method 100, operation/step 110 comprises a drilling operation/step (e.g., laser drilling, etc.). This drilling operation/step 110 forms a plurality of openings or holes 22 through sides 14 and 16 (as well as tip end 30) so as to connect to internal passages 34, 38 and 42. See, e.g., commonly assigned U.S. Pat. No. 5,609,779 (Crow et al), issued Mar. 11, 1997 and U.S. Pat. No. 6,339,208 (Rockstroh et al), issued Jan. 15, 2002 (the relevant disclosures of which are herein incorporated by reference) for illustrative methods and techniques for carrying out drilling step/operation 110 using laser drilling to form openings or holes 22 in a turbine blade comprising an airfoil having one or more internal cooling passages.

As indicated by dotted arrow 111, grinding data 108 is provided, supplied, inputted or otherwise transmitted to drilling step/operation 110 so that the performance thereof can be appropriately adjusted, as necessary, in drilling openings or holes 22. Because sides 14 and 16 typically do not have exactly the same configuration, shape, orientation, thickness, etc., from cast form to cast form, and particularly because internal passages 34, 38 and 42, along with associated walls 46 and 50, can vary in terms of location, shape, orientation, thickness, etc., form data 103 (or a relevant portion thereof) is also typically provided, supplied, inputted or otherwise transmitted, either as part of the grinding data 108 (via the path indicated by dotted arrow 111), or separately as indicated by dotted arrow 112, to drilling step/operation 110 so that the drilling of openings or holes 22 can be appropriately adjusted, as necessary, in view of form data 103. For example, this form data 103 can be used to determine when each laser drilled opening or hole 22 should achieve "breakthrough" (i.e., when opening or hole 22 reaches interior 24 of airfoil 12 so that laser drilling of the opening/hole 22 can be terminated), to insure that laser drilling of each opening or hole 22 is performed at the appropriate location and with the appropriate orientation (e.g., to avoid intersecting internal walls 46 and/or 50), etc., in drilling operation/step 110, etc. Typically, form data 103 and grind data 108 are collected and combined as accumulated component data that is stored in a common or central location or database (e.g., on a central computer processing facility) with the relevant portion thereof being supplied, inputted or otherwise transmitted to drilling operation/step 110.

After the drilling of openings or holes 22 in the ground component in drilling operation/step 110, the resulting drilled component is inspected, measured, examined, probed or otherwise analyzed as indicated by dotted arrow 113 to determine the characteristics of the drilled component (e.g., the shape, configuration, width, length, width, orientation, shape, configuration, etc., of each drilled opening or hole 22, etc.) to obtain or otherwise provide data (hereafter referred to as "drilling data") indicated as 114. As indicated by solid arrow 115, the drilled form is sequentially moved, transferred, advanced or otherwise subjected to a third manufacturing operation/step indicated generally as 116. In this embodiment of system/method 100, operation/step 116 involves evaluating the in process air flow of the drilled component. As indicated by dotted arrow 117, the in process airflow is analyzed to obtain or otherwise provide airflow data indicated generally by 118.

As shown in FIG. 3, after the in process airflow evaluation operation/step 116, the drilled component is sequentially moved, transferred, advanced or otherwise subjected, as indicated by solid arrow 119, to a fourth manufacturing operation/step indicated generally as 120. In this embodiment of system/method 100, operation/step 120 involves applying a coating, for example, a protective aluminide diffusion coating, to the external surfaces of sides 14 and 16, as well as to the internal surfaces 54, 58 and 62. See, e.g., commonly assigned U.S. Pat. No. 6,332,926 (Pfaendtner et al), issued Dec. 25, 2001 and U.S. Pat. No. 6,616,969 (Pfaendtner et al), issued Sep. 9, 2003 (the relevant disclosures of which are herein incorporated by reference) for illustrative methods and techniques for carrying out coating step/operation 120 on both external and internal surfaces of a turbine blade. As also shown in FIG. 3, drilling data 114 (as indicated by dotted arrow 121), as well as airflow data 118 (as indicated by dotted arrow 122), is provided, supplied, inputted or otherwise transmitted to coating operation/step 120 so that the performance thereof can be appropriately adjusted, as necessary. In addition, as indicated by dotted arrow 123, the accumulated component data comprising the combined formed data 103 and grinding data 108 (or relevant portion thereof) can also provided, supplied, inputted or otherwise transmitted to coating operation/step 120 so that the performance thereof can be appropriately adjusted, as necessary, based on this accumulated component data. Again, this form data 103 and grind data 108, along with the drilling data 114 and airflow data 118, can be collected and combined as accumulated component data that is stored in a common or central location or database (e.g., on a central computer processing facility) with the relevant portion thereof being provided, supplied, inputted or otherwise transmitted to coating operation/step 120.

While FIG. 3 shows an illustrative embodiment of the system/method 100, it should be understood that the order/sequence of the manufacturing operations/steps 101, 105, 110, 116 and/or 120 (as well as associated inspection, measurement, examination or other analysis used to generate, obtain, provide, transmit, etc., data 103, 108, 114 and/or 118) can be deleted, changed, altered, modified, etc., as needed, and that additional manufacturing operations/steps (e.g., welding of tip end 30, further shaping of airfoil 12, etc.) can be also be included in the system/method 100, along with associated inspection, measurement, examination or other analysis to generate, obtain, provide, transmit, etc., data that can be collected and combined with other data as accumulated component data, for use therein. As previously mentioned, the system/method 100 of FIG. 3 can also be used, as is or as modified, to provide other final manufactured components.

While specific embodiments of the this invention have been described, it will be apparent to those skilled in the art that various modifications thereto can be made without departing from the spirit and scope of this invention as defined in the appended claims.

What is claimed is:

1. A manufacturing method comprising the following steps:
(a) providing a component form and a component form data set comprising data for the component form for obtaining a processed component having three-dimensional internal structural characteristics;
(b) providing at least a relevant portion of the component form data set
(c) performing a first manufacturing step on the component form to provide a processed component, wherein the at least relevant portion of the component form data set is used to adjust the manner in which the first manufacturing step is performed;
(d) analyzing the processed component to provide a processed component data set
(e) combining the component form data set with the processed component data set to provide accumulated component data
(f) performing a second manufacturing step on the processed component, wherein at least a relevant portion of accumulated component data is used to adjust the manner in which the second manufacturing step is performed; and
(g) repeating steps (d) through (f) after step (f) one or more times until a final manufactured component is obtained, wherein the component form provided in step (a) is a turbine component form that includes internal three-dimensional structural characteristics and is a cast airfoil form comprising an airfoil having one or more internal cooling passages and a blank root portion extending from the airfoil, and wherein step (c) comprises forming a dovetail in the blank root portion to provide a dovetail-containing turbine component, wherein step (f) comprises drilling holes in the airfoil of the dovetail-containing turbine component of step (c) to connect the drilled holes to the one or more internal cooling passages to provide a drilled turbine component, and wherein step (g) is repeated so as to carryout the additional manufacturing step (h) which comprises applying a protective coating to one or more of the external surface of the airfoil and the internal surface of the airfoil of the drilled turbine component of step (g).

2. The method of claim 1 wherein step (g) is repeated so as to carryout the additional manufacturing step (i) which comprises evaluating prior to step (h) the in process airflow of the drilled turbine component of step (g).

3. The method of claim 1 wherein step (c) is carried out by grinding the dovetail in the blank root portion.

4. The method of claim 1 wherein step (f) is carried out by laser drilling.

* * * * *